Figure 1:
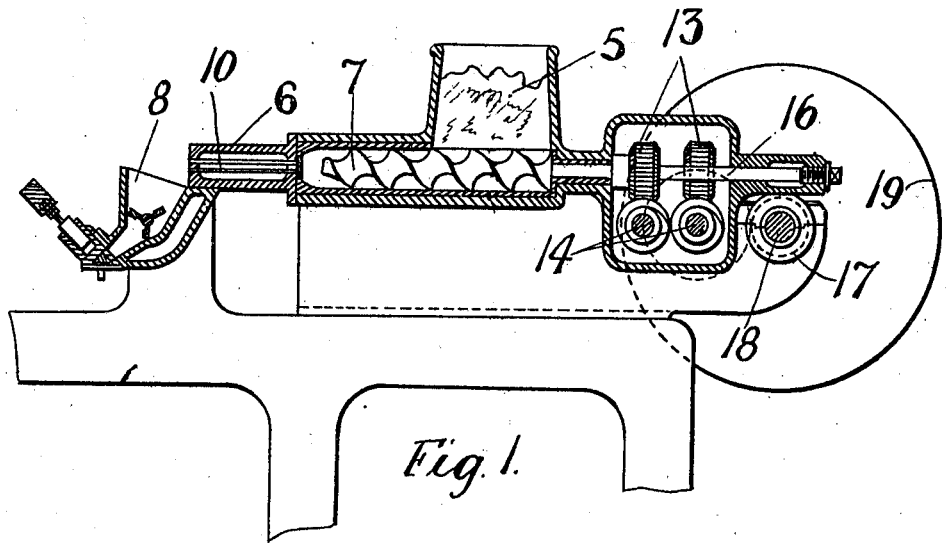

W. BOYD.
PROCESS OF HEATING CREAM USED FOR MAKING FONDANTS, CHOCOLATE CENTERS, AND THE LIKE.
APPLICATION FILED JUNE 29, 1907.

978,131.

Patented Dec. 13, 1910.

WITNESSES
W. P. Burke
Edw. J. Cuts

INVENTOR
William Boyd
BY
Jm Hallau Stub
ATTY

UNITED STATES PATENT OFFICE.

WILLIAM BOYD, OF DUNDEE, SCOTLAND, ASSIGNOR OF ONE-HALF TO JAMES KEILLER AND SON LT'D., OF DUNDEE, SCOTLAND.

PROCESS OF HEATING CREAM USED FOR MAKING FONDANTS, CHOCOLATE CENTERS, AND THE LIKE.

978,131. Specification of Letters Patent. Patented Dec. 13, 1910.

Application filed June 29, 1907. Serial No. 381,529.

*To all whom it may concern:*

Be it known that I, WILLIAM BOYD, a subject of the King of Great Britain and Ireland, and residing at Dundee, in the county of Forfar, Scotland, (whose postoffice address is 9 Albert Square, Dundee,) have invented a certain new and useful Improvement in the Process of Heating Cream Used for Making Fondants, Chocolate Centers, and the Like, of which the following is a specification.

This invention relates to the process of heating cream used for making fondants, chocolate centers and the like, the objects being to reduce to a minimum the possibility of the cream becoming discolored and what is known in the trade as "grained" or "fired" through exposure to heat for too long a time, or to too high a temperature and to reduce the cost of production by substituting a continuous process of reheating the cream for an intermittent one.

In order that my said invention and the manner of putting the same into practice may be properly understood, I have hereunto appended an explanatory sheet of drawings in which the same reference numerals are used to indicate corresponding parts in the figures shown.

Figure 2:
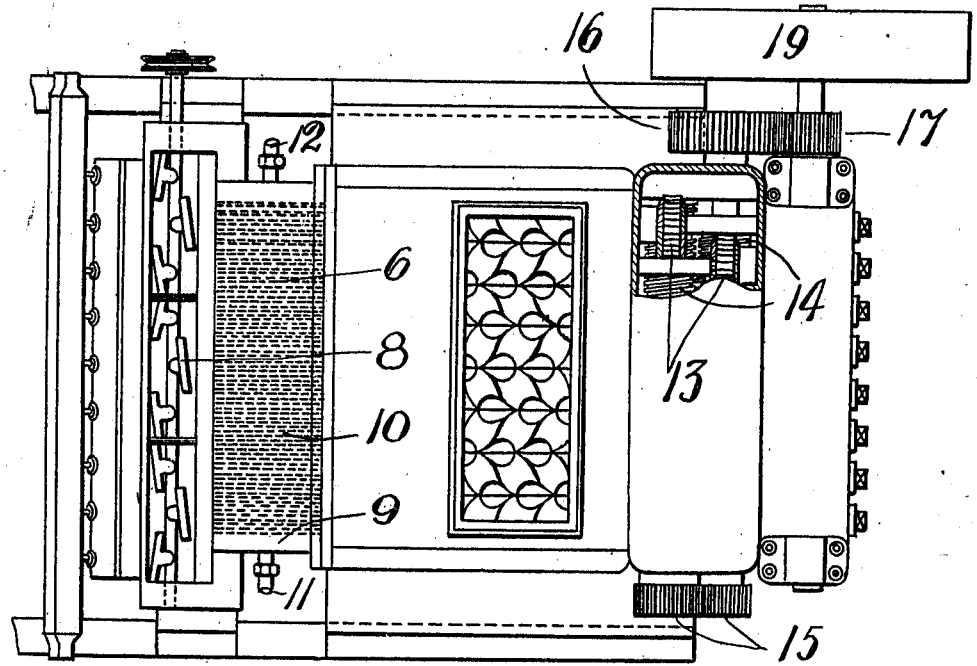
Figure 3:
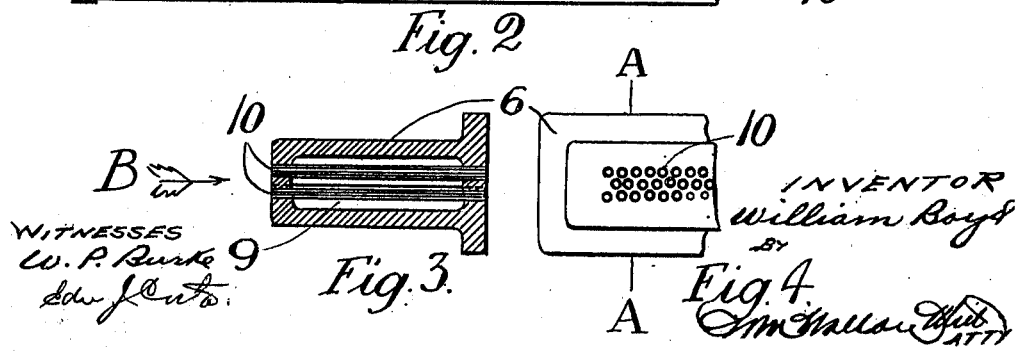
Figure 4:
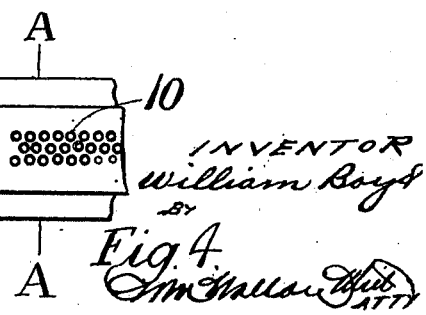

Figure 1 is a part sectional elevation of a feeding, heating and depositing machine fitted with my improvement. Fig. 2 is a plan of same. Fig. 3 is a section at A. A. of the heating apparatus (Fig. 4) and Fig. 4 is a part face view of same looking in the direction of the arrow B. (Fig. 3).

According to existing methods, the heating of the cream, which is rendered necessary in order that it may be poured into suitable shapes or molds, is accomplished in the following manner. The cream is placed in a steam heated or hot water jacketed pan and is broken up and kept in motion by a "spaddle" operated by hand, or by a suitable mechanical stirring device, its purpose being to keep the cream agitated while the heat is being applied. When heated to the desired temperature it is ready for pouring which is accomplished by hand, or by means of a depositing machine. This process which occupies a considerable time causes the cream to become more or less darkened in color and if heated too much, more or less grained.

In my process, the breaking up, the heating and the depositing of the cream into molds is accomplished in one continuous operation and in a fraction of the time occupied by the old method, thereby reducing to a minimum the possibilities of discoloration or graining. Experiments have shown that much better results can be obtained by my process than by the older methods.

In carrying out my invention, I cause the cream 5 to pass through a tubular heater 6, hereinafter described, which is the main feature of my invention, by means of suitable screws 7, reciprocatory plungers, single or double acting; or equivalent devices, direct into the hopper 8 of a depositing machine which automatically drops it into molds, or the like, in the usual manner. The tubular heater 6 consists of a closed vessel 9 in which are a number of small tubes 10 which form passages through it, these tubes being fitted steam tight. To each opposite side of the vessel is coupled a pipe, the one 11 being the inlet and the other 12 an outlet steam pipe, the arrangement being such that steam at the desired temperature passes through the vessel 9 and around the outside of the aforesaid tubes 10, thereby heating the cream as it passes through the tubes. A drain pipe and a safety valve, not shown in the drawings, may be provided, if desired. This heating chamber is attached to a feed apparatus composed of screws 7, as previously referred to, being so arranged that the cream 5 is forced through the tubes 10, from whence it falls into the depositing hopper.

Each screw 7 is rotated by a worm wheel 13, these worm wheels being driven by a pair of screws 14 running in opposite directions being coupled together by spur wheels 15, the driving screw, in turn, being operated by a spur wheel 16 driven by a spur pinion 17 on the shaft 18 which is actuated by the belt pulley 19. The belt pulley 19 is driven by a drum on a shaft, not shown, and the speed of such drum can be regulated by a belt cone pulley operating another similar cone pulley, the position of such belt being determined by a slidable fork operated by a screw controlled by a hand wheel, the object being to feed the cream into the heating chamber at such a rate that it will receive the proper amount of heating before it passes into the depositing machine.

By the use of the heating chamber 6, of the type described, the cream 5 is broken up into a number of thin streams to each of which uniform heat is applied and as it continuously and quickly passes through the tubes; no opportunity is given for it to grain, nor yet to become discolored. Various flavors and colors can be added to the cream before or after the heating process.

Having now described my invention, what I claim as new and desire to secure by Letters Patent is:—

The herein described process of heating cream for making fondants and the like, which consists in forcing the cream to travel quickly through a heating zone in a plurality of thin streams.

In witness whereof I have hereunto set my hand in presence of two witnesses.

WILLIAM BOYD.

Witnesses:
 HILARY AGNEW,
 GEORGE CAMERON DOUGLAS.